Nov. 19, 1968  D. P. ANDERSON ET AL  3,412,183
METHOD OF AND APPARATUS FOR FORMING HOLLOW PLASTIC STRUCTURES
Filed Sept. 24, 1965  8 Sheets-Sheet 1

INVENTORS
DAVID P. ANDERSON
LESLIE J. BERRIDGE
BY
*Burton & Parker*
ATTORNEYS

INVENTORS
DAVID P. ANDERSON
LESLIE J. BERRIDGE
BY

*Burton & Parker*
ATTORNEYS

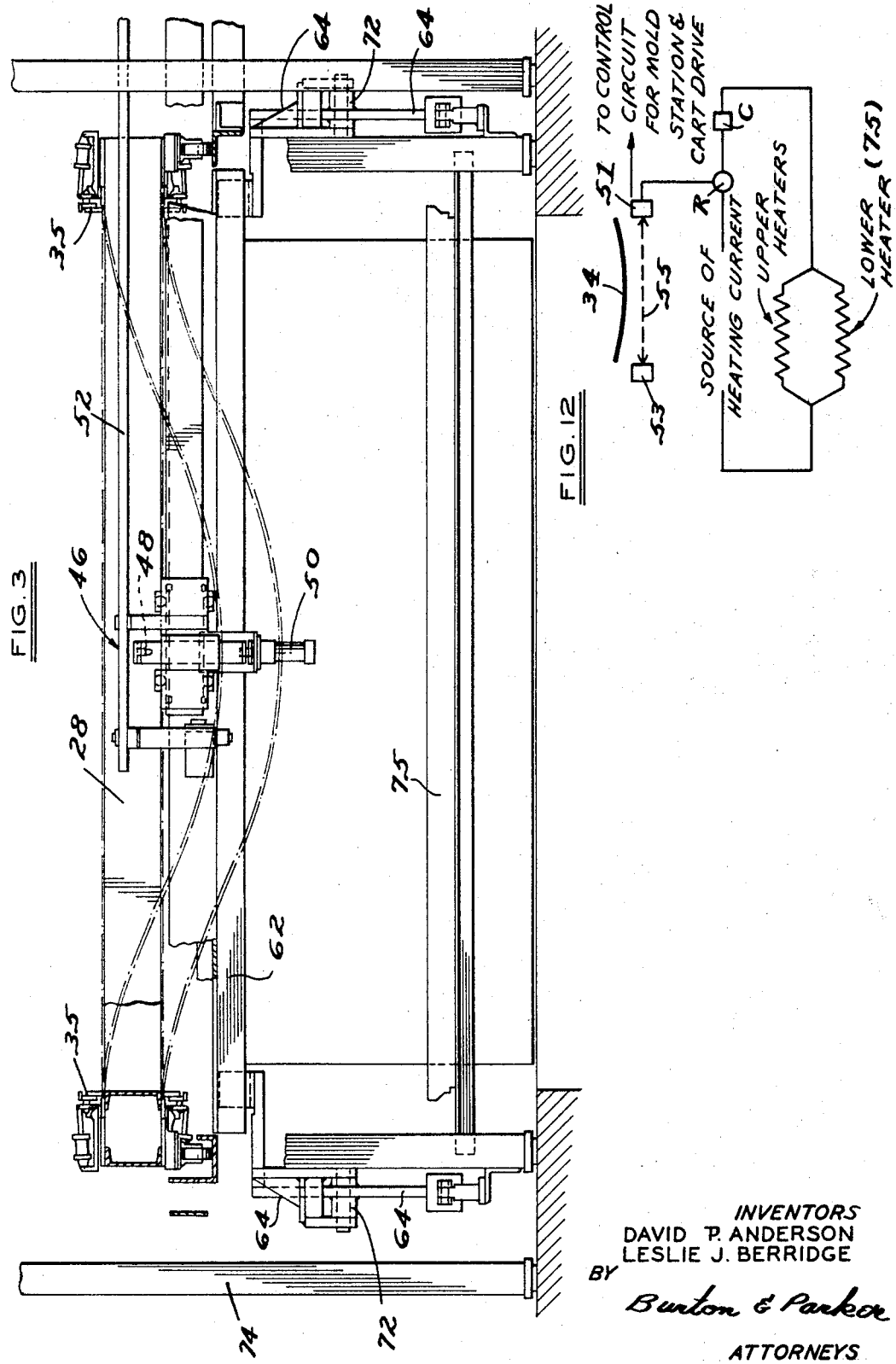

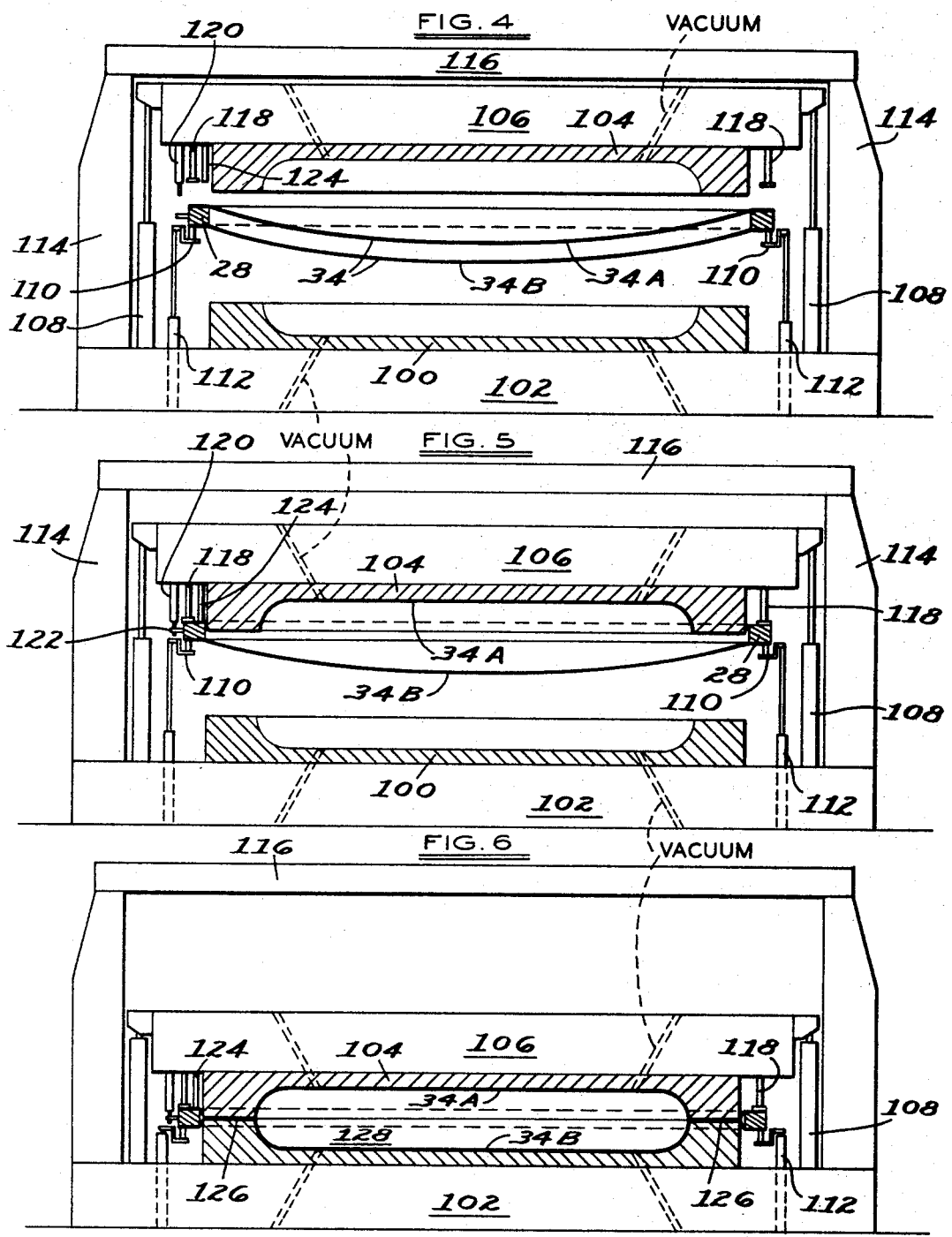

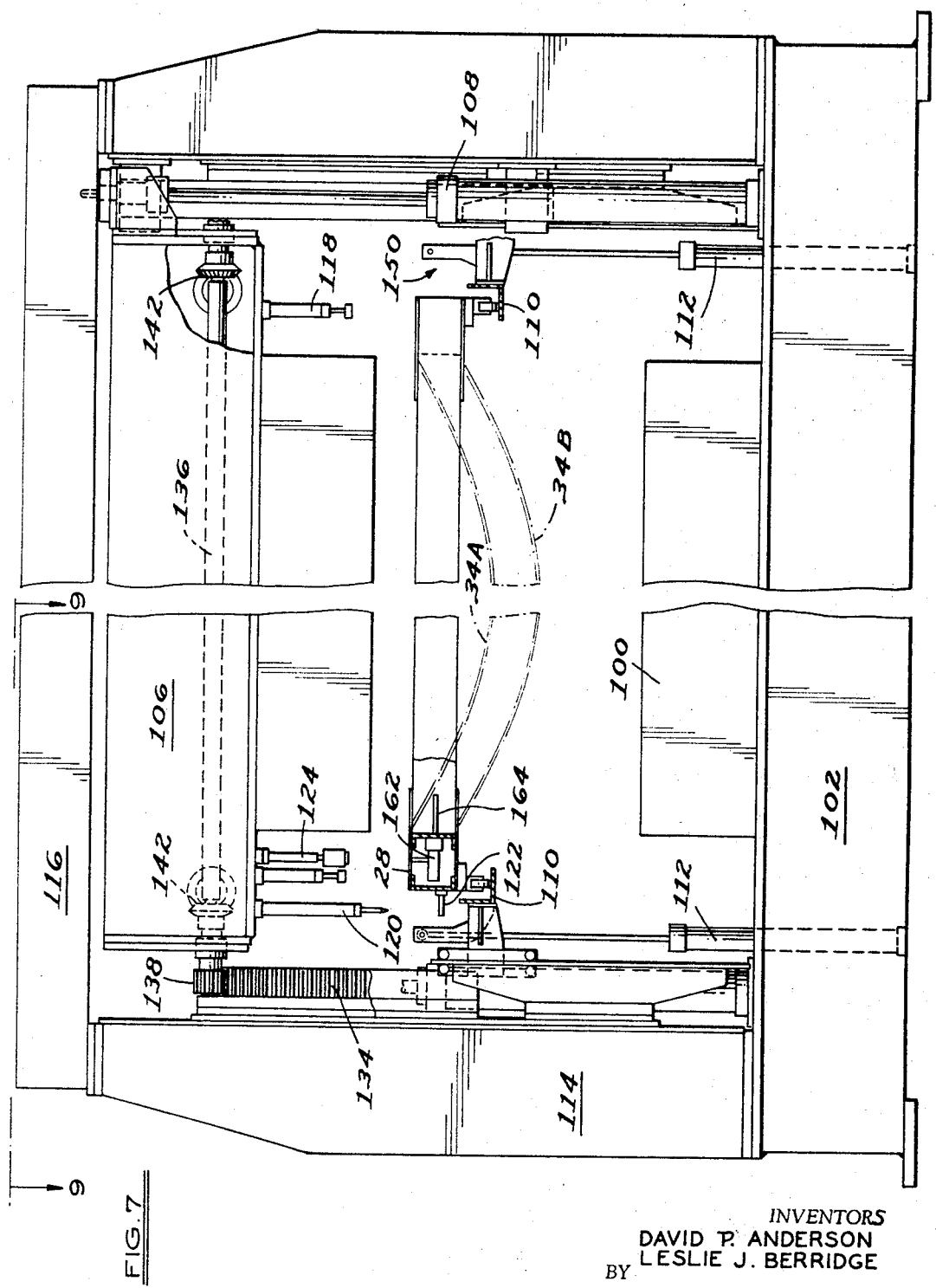

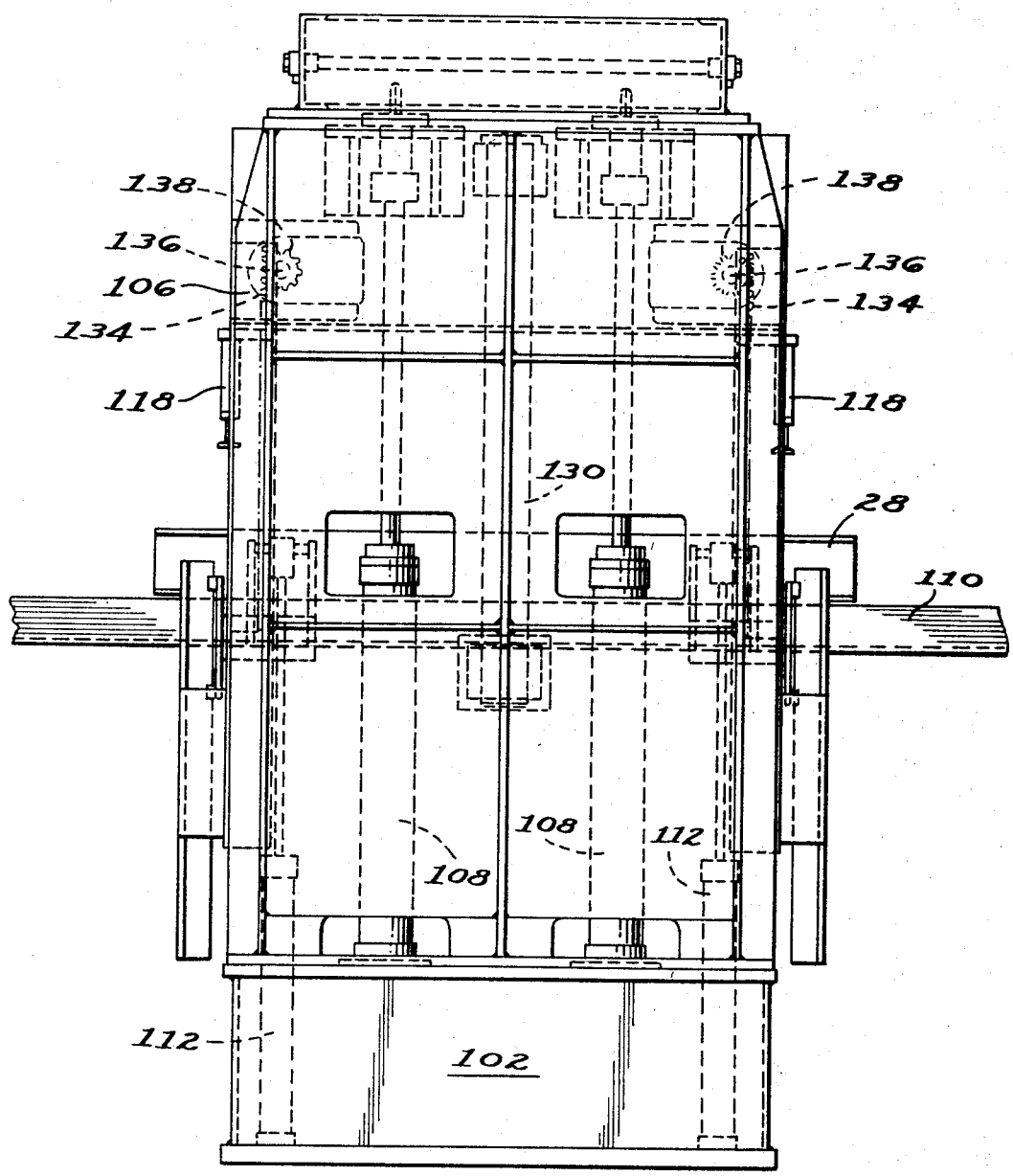

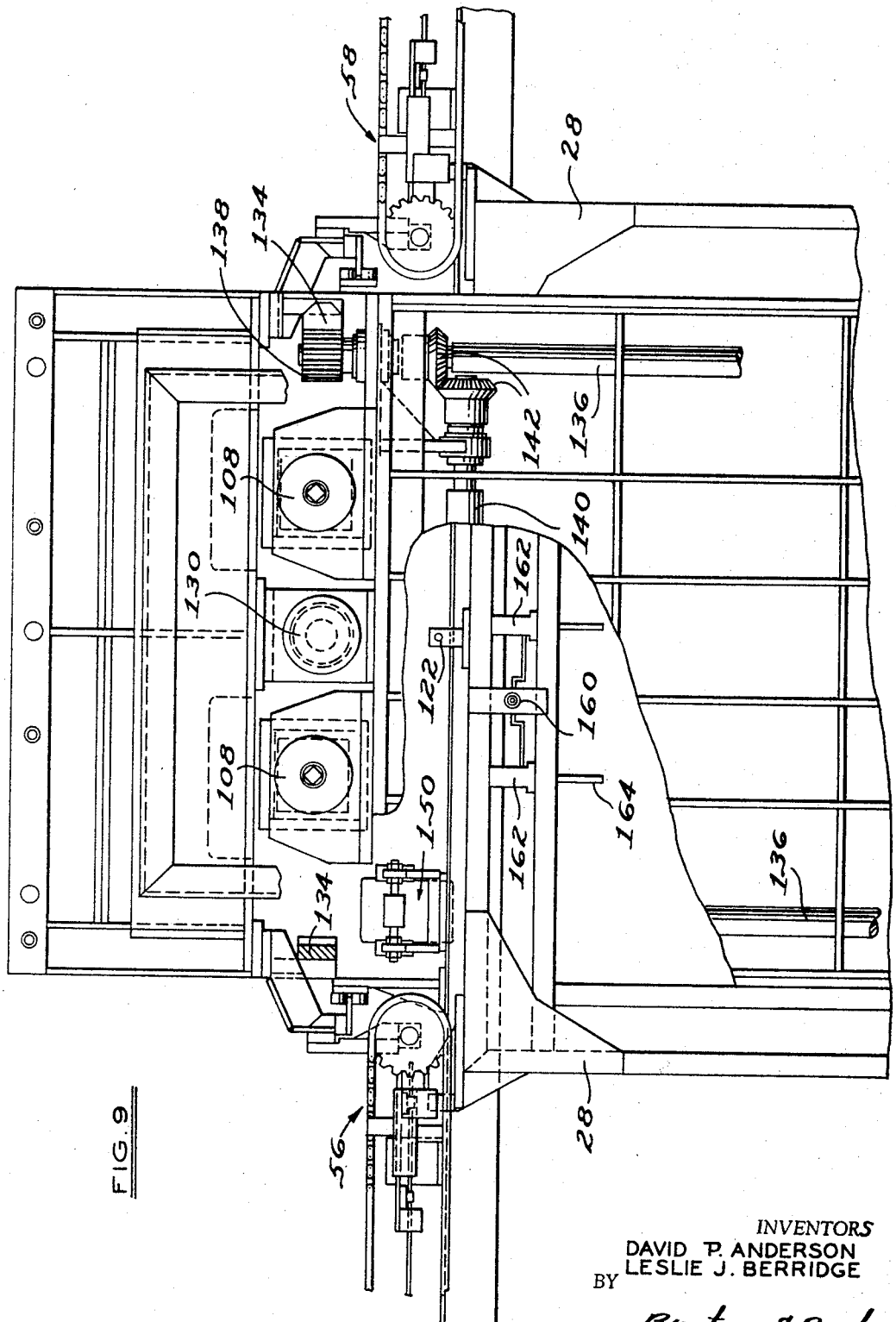

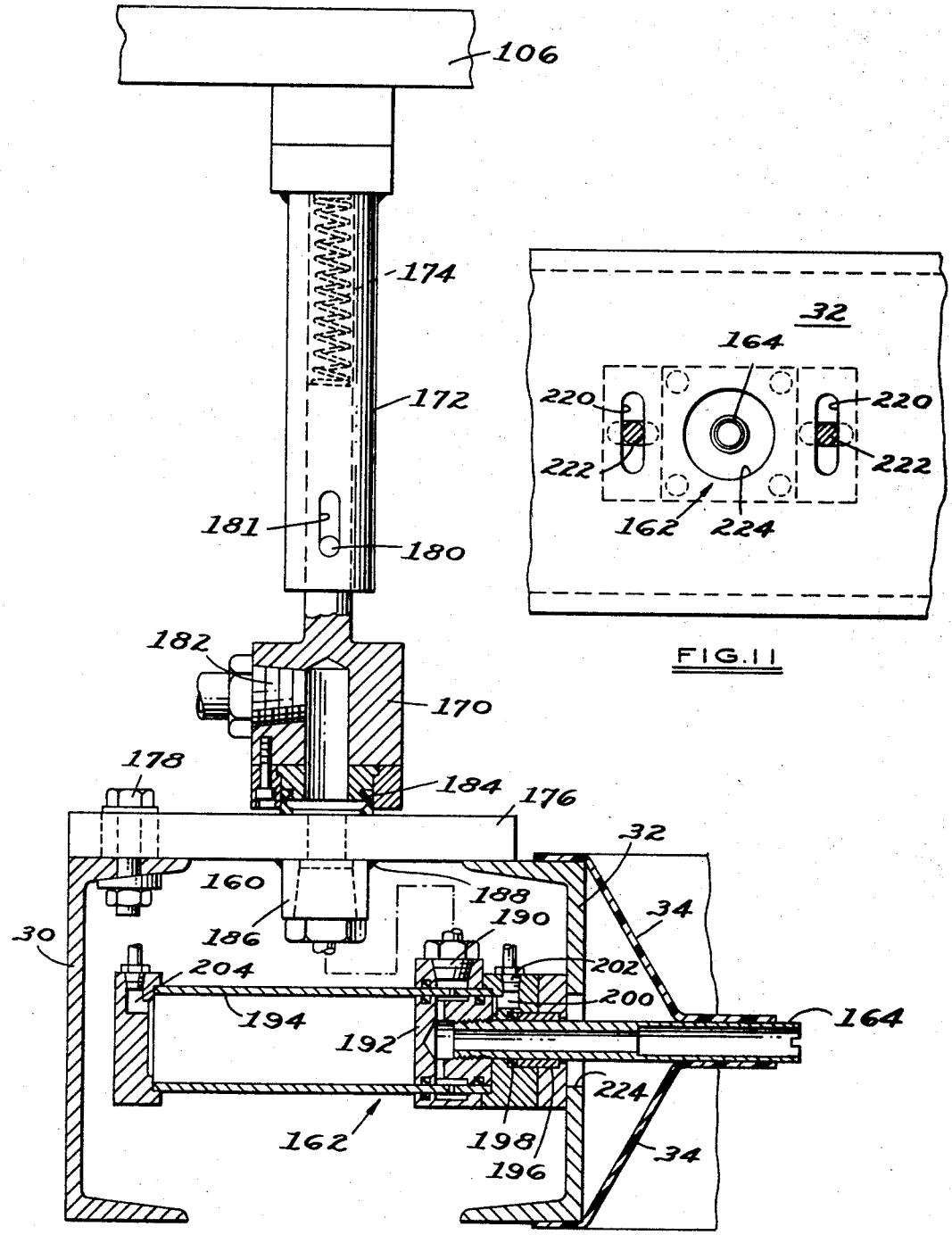

United States Patent Office

3,412,183
Patented Nov. 19, 1968

3,412,183
METHOD OF AND APPARATUS FOR FORMING HOLLOW PLASTIC STRUCTURES
David P. Anderson, Lathrup Village, and Leslie J. Berridge, Detroit, Mich., assignors to Woodall Industries, Inc., Detroit, Mich., a corporation of Michigan
Filed Sept. 24, 1965, Ser. No. 489,968
7 Claims. (Cl. 264—40)

ABSTRACT OF THE DISCLOSURE

This disclosure relates to a method and apparatus for forming two-ply plastic structures. The apparatus includes a continuous forming machine which routes the sheets to be formed through various stages, including a heating station, where the sheets are heated to their fusion temperature while suspended in spaced relation, and a forming station where the sheets are individually vacuum formed. The die apparatus of the forming station includes a shiftable die which is moved into contact with one of the spaced sheets, where the sheet is formed. The shiftable die and the formed and unformed sheets are then shifted to contact the unformed sheet with the other die, where it is formed. And the shiftable die then brings predetermined portions of the plastic sheets together into fusion.

---

This invention relates to an improved process and apparatus for forming hollow plastic structures. The process and apparatus of this invention is particularly, although not exclusively adapted to a continuous and substantially automatic forming of hollow plastic structures. The process and apparatus of this invention is particularly useful in forming hollow plastic structures which do not lend themselves to formation by conventional vacuum forming or blow molding techniques, either because of size, shape or structural complexity. The hollow Boat Hull disclosed in United States Design Patent 197,932 is an example of a structure that may be formed by the herein disclosed process.

Virtually any form of hollow plastic structure may be formed by the process and apparatus of this invention. Dissimilar structural parts, such as the inner and outer shell of a hollow plastic boat hull, may be simultaneously formed and fused into a sealed and stress-free unitary structure. The only requirement placed on the parts to be formed is that they be capable of heat fusion, and therefore dissimilar plastic sections may be combined according to the ultimate structural requirements. For example, in a boat hull design the plastic used in the outer shell may be of a heavier duty plastic able to withstand severe conditions, and the inner shell may be of a lighter, less expensive plastic.

The process and apparatus of this invention is also capable of simultaneously forming several smaller hollow plastic structures, such as plastic ducts, containers, automotive trim panels, etc. This invention is particularly applicable to the formation of structures of the character described and other similar structures wherein cheapness as to cost, light weight, self-supporting rigidity, and strength sufficient to fulfill the purposes of the structures, ease of fabrication, attractive appearance and high strength to weight ratio are combined. Other continuous processes for the forming of hollow plastic articles, such as blow molding, are limited to relatively small, homogeneous, relatively simple hollow plastic structures, such as containers and the like.

There is described in a co-pending application of Greig et al. Ser. No. 467,819, filed June 18, 1965, now Patent No. 3,242,245, the basic process herein disclosed. A substantial number of hollow plastic structures of various sizes, shapes and designs, have been manufactured using the basic process, and as a result of this work certain improvements have been developed, both in the process and the apparatus of carrying it out which have been found highly meritorious.

For example, in the manufacture of structures utilizing the basic process we have discovered that equipment cost, efficiency and reliability can be substantially improved by the use of a forming press having a stationary die and a cooperating movable die, with the sheets to be formed and fused, being shifted into position between the dies and there temporarily held while the movable die moves into contact with one of the sheets to form it and then with such sheet so formed and while being held against the movable die, such die and the other sheet move conjointly toward the stationary die to bring the unformed sheet thereagainst to effect a forming of such sheet, with continued movement of the movable die urging the thereby formed sheets into fusion contact with each other between the dies.

A machine for carrying out this improved process has been built and is in successful operation. The stationary die and the movable die in such machine are disposed in vertically spaced-apart relation when the press is open to receive the sheets, the lower die being the stationary die and the upper die moving vertically toward and away from it. Such machine is disclosed in the instant application. The sheets, disposed in vertically spaced relation, are carried by a frame. The sheets are loaded in the frame at a loading station and the frame then moves on tracks to a heating station where the sheets are heated to their fusion temperature. The heated sheets then travel to a molding station (where the press is located) and are there acted upon to form the hollow plastic article. After the article has been formed, the press opens and the frame carrying the formed article is moved to an unloading station where the formed article is removed from the frame.

In the molding station, or press, the upper die moves down to engage the upper sheet which is thereupon vacuum formed against the die, and as the upper die continues its descent it moves the frame downwardly toward the stationary lower die bringing the lower sheet thereagainst and vacuum forming of the lower sheet against the stationary die occurs. The descent of the upper die continues and brings selected portions of the formed sheets into fusing contact.

During the cooling phase of the process it has been found desirable, as brought out in said co-pending application, to hold the sheets firmly against the forming faces of the dies by a positive fluid pressure within the hollow plastic structure defined by the formed and fused sheets. As even a relatively low pressure, such as 25 to 50 p.s.i. will exert a large force against the die supporting structure when articles having large opposed surface areas are being formed, a rather massive press is necessary to resist the force. We have found that a more economical press can be designed to withstand this force if only one of the dies is movable, and in the disclosed embodiment the upper die is the movable one. It is however, within the broad purview of this disclosure that the upper die might be stationary and the lower die movable.

Also, because a massive press structure may be required, prior art vacuum forming machines do not lend themselves to adaptation for carrying out the improved process.

The apparatus of this invention which carries out the above described process has been completely automated, and can accommodate three or four frames at the same time. The time cycles and the arrangement of the stations optimize the operation. For example, the heating cycle may, according to one form of the machine, be controlled to bring the sheets to their fusion temperature at the moment the molding station is free for another cycle. According to this concept the heating cycle must be controlled within close tolerances to avoid over-heating and collapse of the sheets, while at the same time the sheets must reach their fusion temperature to carry out the process. According to another form of control, the length of the heating cycle is determined by the amount of sag in the plastic sheets being heated; when the sheets have sagged a determined amount the frame carrying the sheets moves out of the heating station and into the forming station.

Materials which have been found suitable for the process and apparatus herein described are certain polyethylene polymers, which provide the density and flexibility of the sheets desired. Other plastic materials may be employed if desired as hereinafter set forth.

Another object of the invention is the provision of means for injecting fluid pressure between the formed and fused sheets during the cooling of the sheets and which will not thereafter interfere with removal of the formed article from its supporting frame.

Other objects, advantages, and meritorious features will more fully appear from the following specification, attached claims and appended drawings, wherein:

FIG. 3 is a partially cross sectioned side view of the heating station in the direction of view arrows 3—3 as shown in FIG. 1;

FIGS. 4 to 6 are schematic end views of the molding station showing different stages of the molding cycle;

FIG. 7 is a partally cross sectioned end elevation of the molding station;

FIG. 8 is a side elevation of the molding station;

FIG. 9 is a top elevation of the molding station, in the direction of view arrows 9—9 as shown in FIG. 7, partially cut away for clarity;

FIG. 10 is a cross sectioned side elevation of the air injection system in the direction of view arrows 10—10, as shown in FIG. 1;

FIG. 11 is an end view of the frame injection cylinder, as shown in FIG. 10; and FIG. 12 is a schematic control diagram illustrating one form of control for operating the heating and molding stations.

Figure 1:
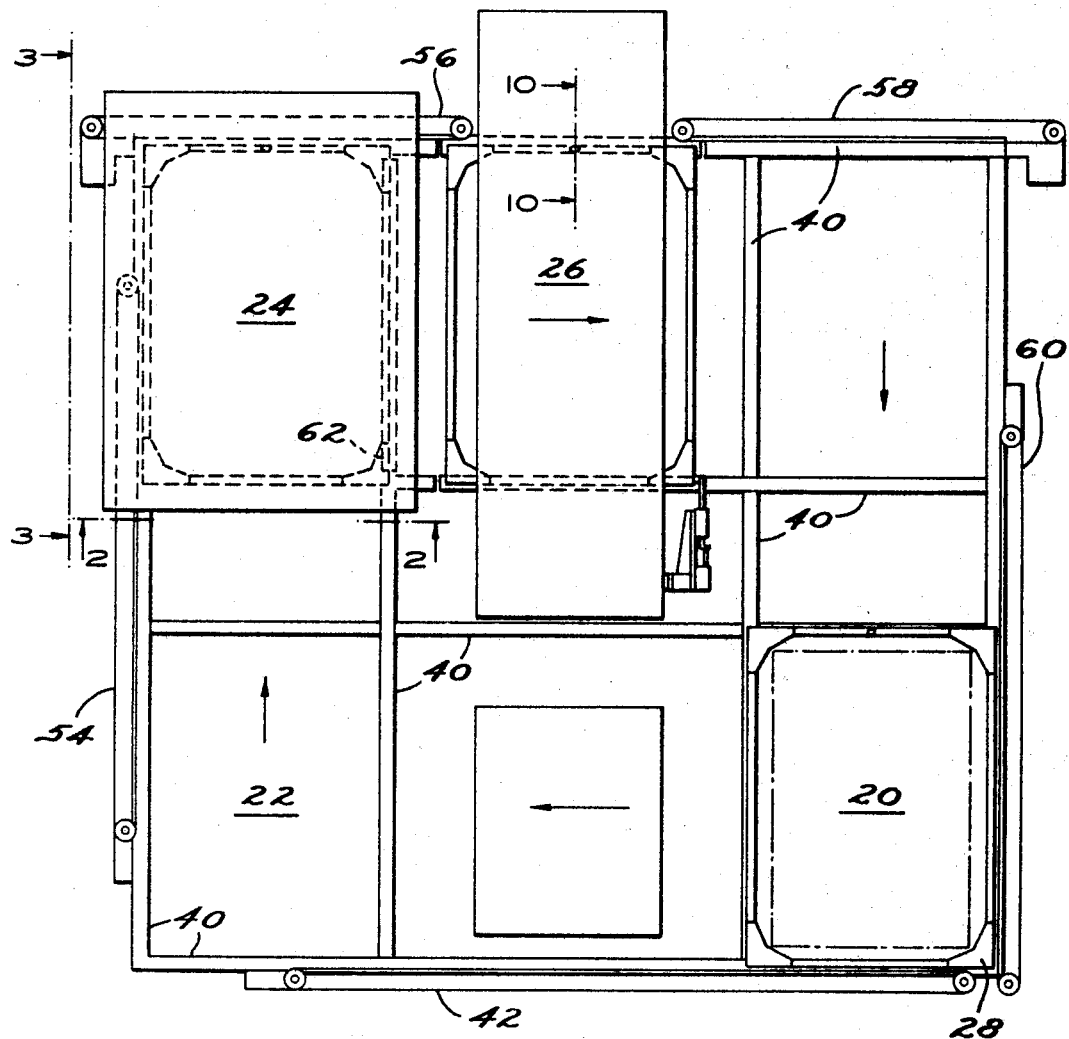
FIG. 1 is a schematic plan view of the machine showing the operation stations.

Referring to FIG. 1, wherein 20 is the loading and unloading station, 22 is a delay position where the loaded cart assembly awaits the completion of the heating cycle, 24 is the heater station, and 26 is the molding station.

Two heat fusible plastic sheets are loaded in spaced relation on a cart assembly, indicated schematically at 28 at the loading and unloading station 20. The cart assembly 28 is shown in more detail in FIG. 2, wherein 30 indicates the rigid rectangular cart frame, and 32 indicates the adjustable rectangular sheet frame. The width and length of the sheet frame is adjustable to accommodate various sizes of plastic sheets.

The heat fusible plastic sheets 34 may be characterized as rigid, though in large sizes such as 4′ by 8′ are also somewhat flexible. They are positioned, at the loading station, against the upper and lower inturned flanges of the sheet frame 32. The sheets are then clamped in this position by a system of clamps 35, which are operated by air cylinders 36. Any suitable clamps may be used. The cart assembly is mounted on swivel wheels 38, and moves from station to station on tracks 40.

After the plastic sheets have been loaded on the cart 28, the cart assembly is moved, by the load station drive 42, to the delay position 22 to await completion of the heating cycle. From this position, through the completion of the forming operation, the movement of the cart and the function of the stations is automatically controlled by a control system, not shown. Many suitable forms of control will be apparent to those skilled in the art from the description of the operation herein described and therefore the details of the control system are not shown.

Figure 2:
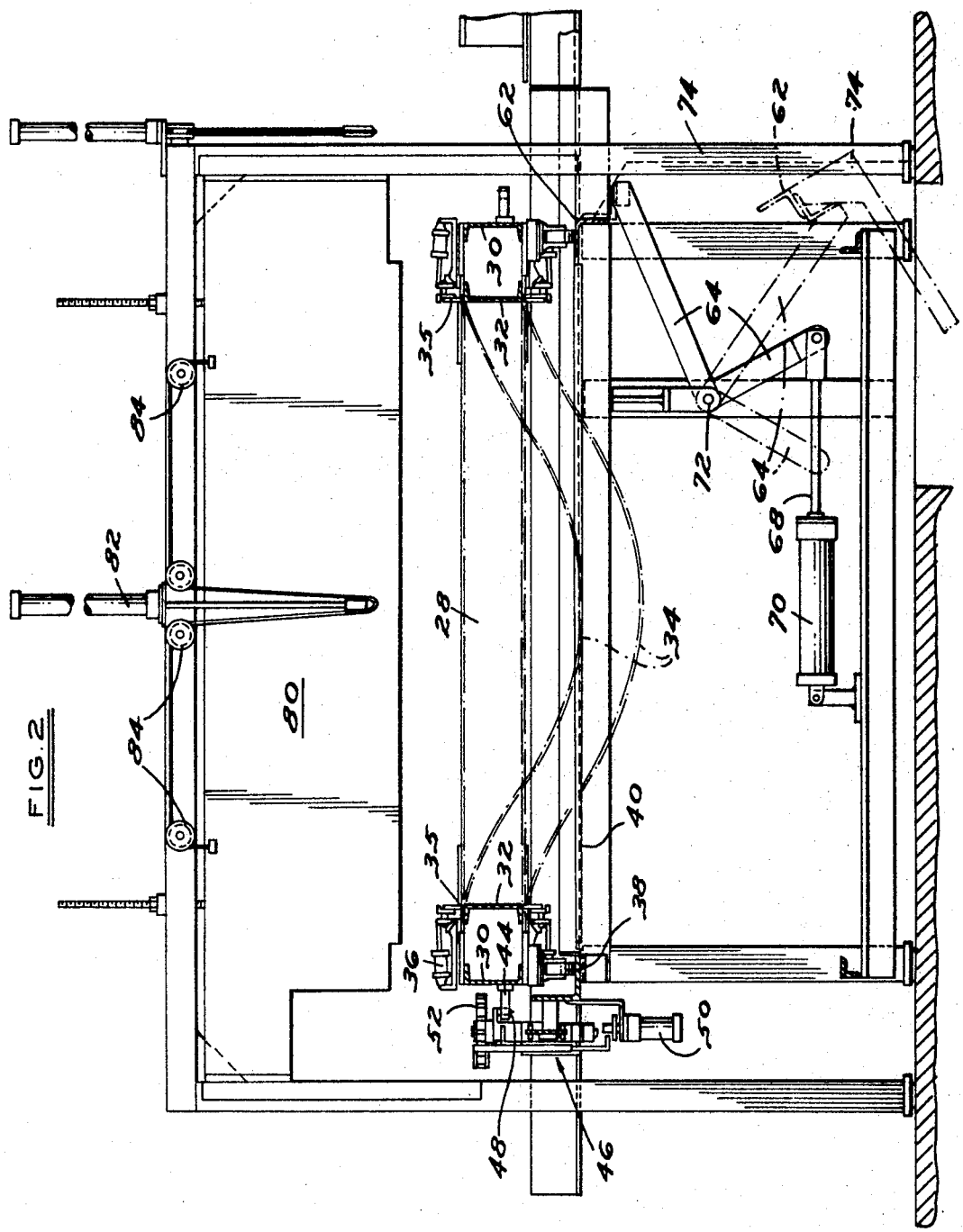
FIG. 2 is a partially cross sectioned end view of the heating station in the direction of view arrows 2—2 as shown in FIG. 1.

A typical chain drive assembly is shown in FIGS. 2 and 3. The cart frame 30 is provided with a tang 44. The drive assembly, indicated generally at 46, is provided with a pin 48 which is lowered into engagement with the tang 44 by operation of the air cylinder 50. The drive assembly is chain driven by the chain shown at 52, which is operated by a sprocket and motor not shown.

When the heating cycle of the plastic sheets in the heater station 24 is complete, the cart is moved to the molding station 26, by the heater station drive 56. The cart at the delay position 22 is then moved by the drive mechanism 54 into the heater station 24.

According to one form of control for the machine the operation is based on the time required for the molding station to mold and sufficiently cool an article being formed so that it may be removed from the molding station. The time cycle of the heater station 24 is regulated to bring the sheets to their fusion temperature at the moment the molding station has completed its cycle of operation. This is a critical relationship, because the sheets elongate as they are heated and, because they are supported only at their peripheral edges, they sag as shown in FIGS. 2 and 3. If the sheets are overheated they will collapse, and if the sheets have not reached their fusion temperature when they enter the molding station they will fail to fuse together. The sheets can be sustained at their fusion temperature for only a few seconds, and therefore according to this form of control the heating cycle must be accurately controlled to synchronize the cycle with the cycle of the molding station. The control is accomplished by the use of electric timers which determine the energization of the heaters in the heating station and the length of the cooling cycle in the forming station. When the timer controlling energization of the heaters times out, the molding station timer has already timed out so that the molding station cycle is completed and the molding station is ready to receive the sheets from the heating station. While many thousands of articles have been formed using this method of control, we have concluded that an improved form of control is possible which is being later described.

At the completion of the molding cycle the formed plastic article, still retained in the cart, is moved from the molding station 26 to the loading and unloading station 20 by the molding station drive means 58 and 60. It can be seen from FIG. 1 that the machine can accommodate at least three carts; one at the loading station 20, one at the heater station 24, and one in the molding station 26. An additional cart can be used if desired, which would be at the delay position 22.

The sheets will sag in the heater station 24 below the level of the tracks 40, as shown in FIGS. 2 and 3. Therefore, a means must be provided to allow the heated sheets to pass from the heater station 24 to the molding station 26 over the cross track section 62, which blocks the passage between the heater station and the molding station. This function is carried out by lowering the track section 62 below the level of the sagging sheets after the cart has reached the opposite tracks in the molding station, and before the cart is moved from the heater station to the molding station. The track section 62 is connected to a bell crank lever 64, as shown in FIG. 2, and the lower portion of the bell crank lever 64 is pivotally connected to a piston rod 68, which is driven by a piston 70. Thus, as the piston rod 68 is drawn into the cylinder 70, the bell crank lever 64 pivots about its fulcrum 72 to lower the track section 62 to the position shown in phantom in FIG. 2. The track section 62 is provided with a heat shield 74, which is lowered with the track section out of the path of the sagging sheets.

The heater station, shown in FIGS. 2 and 3, is provided with opposed banks of heaters, only the lower bank of heaters 75 being shown. The banks may be in any suitable arrangement which will provide an even heating of the sheets. The entrance to the heater station, from the delay position 22, is provided with a shiftable heat shield 80, as shown in FIG. 2. The shield 80 is operated by the air cylinder 82, in cooperation with the sprockets 84, to raise the shield and allow the cart to enter the heater station. The shield is then lowered automatically to cut down on the heat loss through the opening. After the cart has passed the track section 62, from the heater station 24 to the molding station 26, the track section is raised to the position shown in FIG. 2 to support a cart driven from the delay position 22 to the heater station 24.

In FIGS. 4, 5 and 6, there is schematically shown the mold cycle. The die assembly includes a lower die member 100, supported on the lower stationary die platen 102. The upper die member 104 is secured to a movable die platen 106. The upper platen 106 is supported by four reversible hydraulic cylinders 108. The cart assembly 28 is supported on a pair of track sections 110, which are yieldably supported by the pistons 112; and the assembly is enclosed by a frame means 114 and 116.

Extending from the upper platen are: four vertically adjustable feet 118, a guide pin 120 which mates with a tang 122 extending from the cart for alignment of the cart within the molding station, and an air injection connection 124 which will be described in more detail below.

FIG. 4 shows the die assembly as it is positioned to receive a cart 28. The plastic sheets are at their fusion temperature, and have sagged under their weight as described previously. As the cycle begins, the upper platen and die, 106 and 104 respectively, move downward by the action of the reversible hydraulic cylinders 108, to engage the upper plastic sheet 34a. A vacuum is drawn through the upper die member 104, to form the upper plastic sheet 34a to the configuration of the upper die member. At this position, which is shown in FIG. 5, the alignment pin 120 has engaged the cart tang 122, and the vertically adjustable feet 118 have engaged the four corners of the cart.

The upper platen and die member continue the travel downward toward the stationary die member 100, where the stationary die member engages and forms the lower plastic sheet 34b. The lower sheet 34b is formed to the configuration of the lower die member 100 by a vacuum drawn through the lower die member. The upper die member 104 continues its travel toward the lower die member 100, independent of the lower plastic sheet 34b, to bring predetermined portions of the plastic sheets into fusion contact, thus forming a hollow plastic structure. This position is shown in FIG. 6. At this position, and during the cooling cycle, air is injected through the air connection 124, into the chamber 128 within the plastic structure. It can be seen from FIG. 6 that even a relatively low pressure, such as 25 to 50 p.s.i., will exert a large force against the die supporting structures, because of the relatively large opposed areas. This force is opposed by the positive pressure of the cylinders 108, however if the lower die 100 were not stationary the force of the air injected within the plastic chamber might be sufficient to separate the die members.

After the sheets have been cooled sufficiently to retain their shape following removal of the dies, the pistons 108 and 112 are reversed to raise the cart 48, and the upper die 104, to the position shown in FIG. 4. The cart then proceeds to the unloading station, where the formed plastic structure is removed. It can be seen from FIG. 6 that knife edges, or a movable cutting means, might be provided between the opposed faces of the die members, to remove the flash about the formed plastic structure during the molding operation. The formed plastic sructure could then be removed directly from the lower die member 100, or, if the formed structure was not completely severed from the remaining plastic sheets, the structure could be removed at the unloading station as described previously.

FIGS. 7, 8 and 9 show the details of construction of the molding station, which are shown schematically in FIGS. 4, 5 and 6. The elements which are the same as those described in FIGS. 4 to 6, have been numbered in FIGS. 7 to 9 with the same reference characters. It can be seen from FIGS. 8 and 9 that a guide rod 130 is spaced between the reversible hydraulic pistons 108, at either side of the die assembly, upon which the upper platen is guided.

Because the upper platen and die member are shiftable vertically, a leveling assembly is provided in the upper platen, as shown in more detail by the cut-away portions of FIGS. 7 and 9. Four racks 134 extend vertically within the press frame. Two parallel opposed shafts 136, are provided with pinion gears 138 at their opposed ends, which mate with the rack to level the upper platen as it travels down the racks 134. The opposed shafts are driven by a control shaft 140, which coordinates the pinion gears 138 by two pair of bevel gears 142. The feet 118 are also vertically adjustable, by mating screw threads, to aid in the vertical alignment of the cart 48. The details of the cart support means 150 is shown in FIGS. 7 and 9.

The upper platen of FIG. 9 has been cut away to show the air injection system. The inlet 160 communicates with the air connection 124 extending from the upper platen 106. In the embodiment shown in FIGS. 9, 10 and 11 the air injection system in the cart assembly is provided with two reciprocating injection cylinders 162. The tubes 164 of these cylinders reciprocate to extend within the chamber of the formed plastic structure to maintain the sheets against the die surfaces during the cooling cycle, by supplying a positive pressure between the sheets. The tubes are retracted at the loading station to allow the plastic structure to be removed without interfering with the tubes. The details of these structures are shown in FIGS. 10 and 11.

Referring now to FIGS. 10 and 11, wherein is shown one embodiment of the air injection system; the injector head 170 is telescopically received in a hollow cylinder 172, which is secured by a suitable means to the upper platen 106. A spring 174 is received within the cylinder 172, to tension the head against a plate member 176 bolted to the rigid cart frame 30 at 178, and a stop pin 180, on the portion of the head 170 which is received within the cylinder 172, extends through an elongated slot 181, in the cylinder, to prevent the head from extending out of the cylinder 172. The head is provided with an air pressure inlet 182, which communicates with the plate opening 160, and a gasket 184 seals the communication when the head 170 is brought into tensioned engagement with the plate 176.

A nipple 186, welded at 188 to the underside of the plate 176, communicates with the connections 190 on the cart air injection cylinders, referred to generally at 162. The connections 190 communicate with a piston 192, and the shiftable tube 164 is threadably received within the piston. The piston reciprocates within the housing 194, and a bearing 196 and O-ring 198 seal the tube 164 motion within the cylinder. In the position shown in FIG. 10, air injected into the head inlet 182 will communicate, through the tubes 164, with the space between the plastic sheets 34, however the tubes in this position may interfere with the removal of the formed plastic structure from the sheet frame 32. The tubes 164 are withdrawn from between the sheets by forcing air into the channel 200 which communicates with the forward face of the piston 192, through the connector 202. The tubes are extended between the sheets by applying an air pressure through a second channel 204, located at the rearward end of the housing, which communicates with the opposed face of the piston. In operation the tubes 164 may be extended between the sheets at the loading station after the sheets are positioned and during clamping of the sheets on the frame, or at any time prior to forming the sheets. The tubes may be retracted for unloading of the sheets at the loading and unloading station 20.

FIG. 11 is an end view of one of the cart air injection cylinders, which shows that the tubes 164 are vertically adjustable to accommodate minor variations of the mold parting line. The adjustable frame 32 is provided with two elongated slots 220 which receive fastening means 222, which may be a threaded bolt or the like. The tube 164 extends through an enlarged opening 224. The bolts 222 may be secured at any position along the elongated slot 220 to position the tubes 164 within the opening 224 in the sheet frame 32.

According to the previously described method of controlling operation of the machine, the heating of the sheets is carried on at a rate such that they will "presumably" be at the proper fusion temperature when the article in the molding station has been cooled sufficiently to allow its removal from the molding station. As heretofore mentioned such form of control relies upon timing the cycle of operation. It does not depend in each instance upon any actual measurement of the temperature of the sheets being heated or otherwise causing transfer of the sheets from the heating station to the molding station based upon physical changes in the sheets in the heating station. There is merely a presumption that after the sheets have been heated for a certain length of time they will be ready for forming and fusing. We have concluded that a more accurate method of control may be accomplished based on detecting a change in physical character of the sheets during heating of each pair of sheets. As the temperature of the sheets approaches the fusion point they sag and the amount of sag is a fairly reliable indication of whether the sheets have reached their fusion and forming temperature. We have used this sagging of the sheets as the basis for the modified form of machine control.

As shown in FIG. 3 the heating station may be provided with an electric eye arrangement for detecting predetermined sag of the lower sheet of the two sheets 34. Such arrangement may comprise a photoelectric cell 51 and an energizing lamp 53, each of which may be suitably mounted at opposite sides of the station in any convenient fashion, as on frame members of the station. The lamp unit 53 is aimed to provide a light beam 55 which is focused on the cell 51 with the location of the beam being so spaced below the frame that the beam will be interrupted by sagging of the lower sheet when such sheet reaches its fusing and forming temperature. The photoelectric cell is connected in a control circuit schematically shown in FIG. 12 to activate the circuit when the beam is interrupted. Activation of the control circuit will cause the frame carrying the sheets to pass out of the heater station to the molding station.

Among various considerations recommending this latter form of control, not the least is that on some days the ambient temperature in the shop will be higher and therefore less heat need be generated by the heating station in order to bring the sheets to their fusion temperature. On other days the ambient temperature may be lower and therefore the heating station must deliver more heat to bring the sheets to their fusion temperature. By the use of the electric eye arrangement, ambient temperature variations, as well as other variables may be automatically compensated for. While it is of course necessary to insure that the duration of the molding station cycle is sufficient to insure proper cooling—and this is accomplished by regulating the heat output of the heaters so that they will not overheat the sheets before the molding cycle is completed—the control of the molding cycle, is the opening of the molds and removal of the formed article, is based upon the variable duration of the heating cycle, and in this essential this form of control differs from the first described form of the control using the timers.

In setting up this alternative form of control, the machine user determines the minimum length of time required to cool an article in the mold before the mold can be opened and the atricle removed. The electric heaters are then energized at such a rate that under no anticipated variable conditions (such as ambient shop temperature) will the heaters bring the sheets to the forming and fusing temperature in a lesser time. FIG. 12 shows a schematic control diagram in which C represents any suitable control device in the heater circuit for controlling the heating rate of the heaters. The electric eye unit is connected in a circiut to discontinue operation of the heaters through a suitable relay switch schematically shown at R and is also connected to the mold station control circuit and the cart drive control system, such that when the lower sheet 34 has sagged sufficiently to interrupt the light beam 55, the heaters will be shut off, the molds will open and the cart in the mold station will be removed while the cart in the heater station will be conveyed to the molding station. Also, a cart waiting at the delay position 22 will move into the heater station so that the machine cycle can repeat.

It is understood that several modifications may be made to the disclosed structure without departing from the purview of the appended claims, and that many minor details of the structure disclosed have been omitted for the purpose of clarity. The system disclosed is not fully automatic because the plastic sheets to be formed are hand loaded onto the carts. However, this system could be made fully automatic by a mechanized loading system, or the sheets could be extruded directly from the raw materials into a loading mechanism at the loading station. Other modifications of the cart drive system could also be used, and therefore have not been described in detail. The relay control system also has not been described, however one skilled in the art will be able to carry out the teachings of this disclosure without a detailed description of the omitted elements.

What is claimed is:

1. The method of forming plastic articles in which a thermoplastic sheet is horizontally supported and heated to its forming temperature and then transferred to a mold and thereat molded and cooled to retain its molded shape, characterized in that as the sheet is heated it is allowed to sag of its own weight, sensing a predetermined sagging of the sheet, and thereupon transferring the sagging sheet to the molding station.

2. In a machine for forming articles from thermoplastic sheet material, a sheet heating station, a molding station, means for supporting a sheet in the heating station for heating of the sheet and transferring the sheet to the molding station for molding thereof, and a sheet sag detector at the heating station connected to said means and responsive to predetermined sagging of the sheet in the heating station to cause said means to transfer the sheet to the molding station.

3. An apparatus for the forming of hollow plastic structures from plastic sheets horizontally mounted on frame means, including, in combination: a plastic sheet loading station, a heating station communicating with the loading station by a first set of tracks wherein at least one of the sheets tends to sag below the plane of the tracks from the heat of said station, a molding station communicating with the heating station by a second set of tracks which cross the first set of tracks, that portion of said first set of tracks which lies between said second set of tracks blocking the travel of said at least one heated sheet from the heating station to the molding station being vertically shiftable to shift said track portion out of the path of travel of the heated sagged sheets.

4. An apparatus for the continuous forming of plastic structures from two fusible plastic sheets horizontally mounted on a wheeled frame means, including, in combination: a first station for mounting the plastic sheets on the frame means, a heating station communicating with the loading station by a first set of tracks providing for travel of the wheeled frame means wherein the sheets are heated to their fusion temperature causing them to sag below the plane of the tracks, a molding station wherein the heated sheets are formed into hollow plastic structures communicating with the heating station by a second set of tracks, said tracks meeting in an angular crossing junction which requires the heated sheets to cross a portion of the first set of tracks, said track portion being vertically shiftable out of the path of the heat sagged sheets to allow unrestricted travel of the heated sheets between the heating station and the molding station.

5. The apparatus defined in claim 4 wherein the vertically shiftable track portion is automatically advanced out of the path of the heated sheets after the sheets are within the heating station and before they begin their travel to the molding station.

6. The apparatus defined in claim 4 in which said angular crossing junction is within the heating station.

7. In an apparatus for fluid pressure forming and fusing a pair of heat deformable and fusible plastic sheets: a frame upon which the sheets are supported in spaced relation, a fluid pressure delivery means on the frame for injecting fluid pressure between the sheets including a fluid delivery tube supported for reciprocation within the frame, a shiftable die member having a fluid connection which communicates with said fluid delivery means when the die member moves into contact with the frame, and a control means which automatically shifts the fluid delivery tube into the space defined between the sheets to a position for injecting fluid pressure therebetween.

References Cited

UNITED STATES PATENTS

| | | | |
|---|---|---|---|
| 2,836,852 | 6/1958 | Butzko | 264—90 X |
| 3,142,089 | 7/1964 | Wilkalis et al. | 18—19 X |
| 3,153,813 | 10/1964 | Swick | 18—19 |
| 3,193,881 | 7/1965 | Koster | 18—19 |
| 3,242,245 | 3/1966 | Greig et al. | 264—89 |
| 3,256,565 | 6/1966 | Alesi et al. | 18—19 |
| 3,273,203 | 9/1966 | Ross | 264—92 X |
| 3,277,224 | 10/1966 | Whiteford | 18—19 |

ROBERT F. WHITE, *Primary Examiner.*

A. R. NOE, *Assistant Examiner.*